No. 754,043. PATENTED MAR. 8, 1904.
W. H. BRADLEY.
BICYCLE ATTACHMENT.
APPLICATION FILED JUNE 1, 1903.
NO MODEL.

William H. Bradley,
Inventor.

Witnesses
by C. A. Snow & Co.
Attorneys

No. 754,043. Patented March 8, 1904.

UNITED STATES PATENT OFFICE.

WILLIAM HARLEY BRADLEY, OF PORTLAND, OREGON.

BICYCLE ATTACHMENT.

SPECIFICATION forming part of Letters Patent No. 754,043, dated March 8, 1904.

Application filed June 1, 1903. Serial No. 159,575. (No model.)

*To all whom it may concern:*

Be it known that I, WILLIAM HARLEY BRADLEY, a citizen of the United States, residing at Portland, in the county of Multnomah and State of Oregon, have invented a new and useful Bicycle Attachment, of which the following is a specification.

My invention relates to bicycle attachments, and particularly to a device of this character for housing and supporting the crank-shaft, and has for its objects to produce a comparatively simple inexpensive structure for this purpose in which the parts may be readily assembled or disconnected for purposes of cleaning or repairing and one which in practice will present a neat attractive appearance.

To these ends the invention comprises the novel features of construction and combination of parts more fully hereinafter described.

Figure 1:
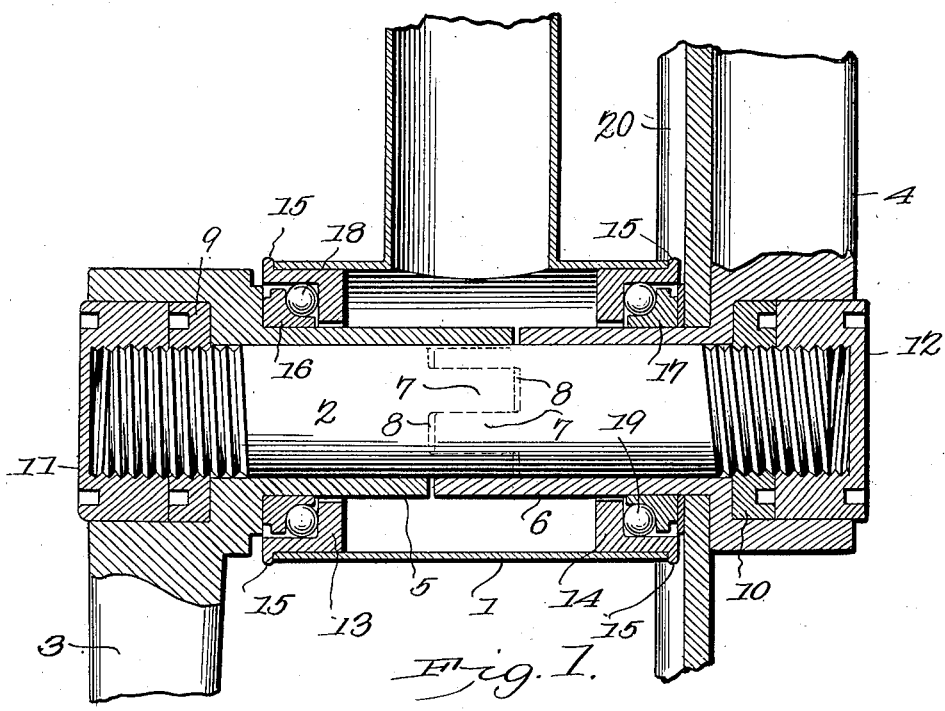
Figure 2:
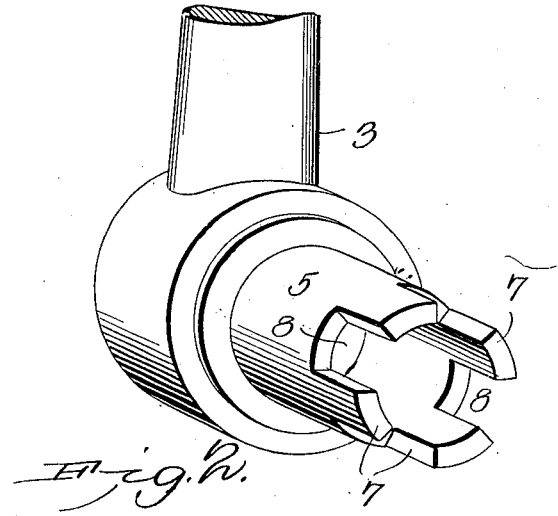
Figure 3:
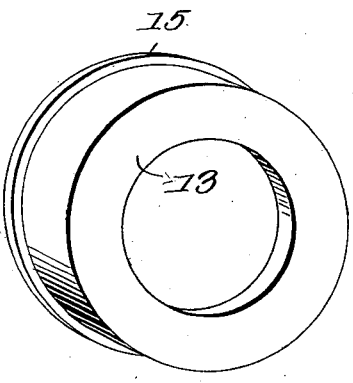

In the accompanying drawings, Figure 1 is a vertical longitudinal sectional elevation of my improved device. Fig. 2 is a perspective view of one of the sleeve-like hubs. Fig. 3 is a perspective view of one of the bearing-rings.

Extending centrally through the casing 1 is a shaft 2, threaded at the ends and projecting beyond the ends of the casing, as shown. Mounted upon the shaft 2 are reversely-disposed crank-arms 3 4, having inwardly-projecting sleeve-like hubs 5 6, forming a shell around the shaft and with their abutting ends formed with interlocking alternating lugs and recesses 7 8, so that the crank-arms will move together.

The hubs of the crank-arms 3 4 are formed with exterior recesses into which the threaded ends of the shaft 2 extend and into which likewise holding-nuts 9 10 are placed, engaging the threaded ends. The threaded ends of the shaft are also provided with jam-nuts 11 12, the outer faces of the latter coming substantially flush with the outer faces of the crank-arms and centrally closed to form a finish to the crank-arms and connections and cover and protect the pedal-shaft.

The nuts will be provided with special apertures to receive a pin-wrench, by which they may be connected and disconnected when required.

Disposed and supported wholly within the ends of the casing 1 are bearing-rings 13 14, having outwardly-extending sleeves provided with shoulders 15 at their outer ends, forming stops engaging the outer ends of the casing 1 for holding the rings properly to bearing position.

Surrounding the sleeve-sections 5 6 next to the inner faces of the hubs of the crank-arms 3 4, between the latter and the bearing-rings and wholly within the casing, are cone-rings 16 17, and between the cone-rings and the bearing-rings 13 14 are antifriction balls or devices 18 19, as shown, whereby antifriction-bearings are provided between the pedal-shaft and casing.

The lugs 7 and their alternating or spacing recesses are of coincident size, whereby they will interlock irrespective of their radial relation one to the other when brought together endwise. Preferably four lugs and four alternating recesses will be formed in each of the sleeve-sections, as shown, so that the crank-arms 3 4 may be set at various angles relative to each other. Thus the crank-arms may be set in opposite relations in the ordinary manner, with the two crank-arms in alinement, or may be radially adjusted relative one to the other when desired.

The main driving sprocket-wheel is represented at 20 surrounding the sleeve-like section 6 adjacent to the inner face of the crank-arm 4 and connected thereto in any suitable manner, so that the crank-arm will positively drive the wheel, the wheel in turn driving the usual chain. (Not shown.)

From the foregoing it is apparent that I produce a comparatively simple inexpensive device in which the parts may be readily assembled or unassembled for purposes of cleaning or repairing and one which in practice will present a neat finished appearance. It is to be understood that in attaining these ends various minor changes in the matter of form, proportion, and manner of assemblage of the parts, except as hereinafter claimed, may be made without departing from the spirit of the invention.

Having thus described the invention, what I claim is—

In a device of the class described, the combination with a casing, of bearing-rings seated wholly within the ends thereof and provided with outwardly-extending sleeves having shoulders at their outer ends engaging the ends of the casing, a shaft extending through the casing and having threaded ends, crank-arms mounted upon the shaft and having inwardly-extending interlocked sleeves, said sleeves having outer enlarged recessed ends lying beyond the casing, nuts tapped onto the ends of the shaft within the recesses, cone-rings disposed wholly within the casing upon the sleeves between the enlarged ends of the latter and the bearing-rings and serving conjointly with the latter to form raceways, and antifriction devices arranged in the raceways.

In testimony that I claim the foregoing as my own I have hereto affixed my signature in the presence of two witnesses.

WILLIAM HARLEY BRADLEY.

Witnesses:
N. B. HALL,
C. A. PETTIT.